United States Patent [19]

Mangum

[11] Patent Number: 4,567,171

[45] Date of Patent: Jan. 28, 1986

[54] STABLE, CONCENTRATED, LIQUID DISPERSIONS OF ANIONIC DYESTUFFS

[75] Inventor: Thomas M. Mangum, Bayville, N.J.

[73] Assignee: Ciba-Geiby Corporation, Ardsley, N.Y.

[21] Appl. No.: 590,234

[22] Filed: Mar. 20, 1984

Related U.S. Application Data

[63] Continuation-in-part of Ser. No. 487,343, Apr. 21, 1983, abandoned.

[51] Int. Cl.$^4$ .............................................. D06P 1/90
[52] U.S. Cl. ....................................... 514/150; 8/552; 8/676; 8/681; 8/682; 534/576; 534/831; 534/880
[58] Field of Search ..................... 260/208; 8/549, 552, 8/675, 682, 681; 534/576, 831, 880; 514/150

[56] References Cited

U.S. PATENT DOCUMENTS

| | | | |
|---|---|---|---|
| 3,127,412 | 3/1964 | Gaertner et al. | 260/208 X |
| 3,726,850 | 4/1973 | Detroit | 260/208 X |
| 3,948,599 | 4/1976 | Irmiger et al. | 260/208 UX |
| 4,042,320 | 8/1977 | Becker et al. | 8/39 C |
| 4,110,073 | 8/1978 | Mallet et al. | 8/85 R |
| 4,202,815 | 5/1980 | Wegmann | 260/208 X |
| 4,328,220 | 5/1982 | Abel et al. | 260/208 X |
| 4,468,230 | 8/1984 | Thomas et al. | 8/528 |

*Primary Examiner*—Floyd D. Higel
*Attorney, Agent, or Firm*—Edward McC. Roberts; Kevin T. Mansfield

[57] ABSTRACT

A composition and a process for the production of stable, water dispersions of anionic dyestuffs, for example acid or direct dyestuffs, useful for the dyeing of organic fibers including paper. Highly concentrated, liquid dispersions of at least 15-40% by weight of dry anionic dyestuff are achieved by the use of nonionic dispersing agents and mixing or grinding in a mill until most of the undissolved dyestuff particles are smaller than 10$\mu$.

6 Claims, No Drawings

STABLE, CONCENTRATED, LIQUID DISPERSIONS OF ANIONIC DYESTUFFS

This is a continuation-in-part of application Ser. No. 487,343, filed on Apr. 23, 1983, now abandoned.

BACKGROUND OF THE INVENTION

Commercial anionic dyestuffs are generally marketed in the form of finely ground powders that, even after treatment with dedusting oils, have a tendency to dust. The handling of large quantities of such dusty products creates undesirable contamination of the environment and hygienic problems for the personnel handling these products. Dye particles in the atmosphere can also lead to undesirable staining of textile materials, making them less valuable.

Also before use for coloring textiles or paper, the requisite dye powders have to be weighed, wetted out, boiled to bring into solution and filtered to make sure there are no undissolved lumps. This method of preparing the necessary dyestuff solution is therefore costly to the dyer, consuming much labor, time and energy. Also in many cases, the water solubility of the dyestuff is inadequate, especially if the dye solution is allowed to cool prior to its addition to the final dye bath. In the case of continuous operations, where relatively concentrated dyestuff liquors are padded onto fabrics at ambient or only slightly elevated temperatures, the limited solubilities of many dyestuffs in the regular powder form make them unsuitable for use.

To circumvent the handling of powders and obtain the advantages of liquids, a number of manufacturers have resorted to the use of organic solvents. The disadvantages with organic solvents are their added cost, increased load on wastewater treatment facilities during use, and in most cases only limited solubility of the respective anionic dyes.

SUMMARY OF THE INVENTION

The present invention relates to and has for its objects compositions and processes for the manufacture of concentrated, fluid, stable, aqueous dispersions of anionic dyes.

Previous publications (e.g. U.S. Pat. No. 4,110,073, Mollett et al., Aug. 29, 1978) disclose that the use of mixtures of anionic dispersing agents allows the preparation of stable and fluid dispersions of anionic dyes. In practice however, it is desirable to have higher concentrations of dyes than can be achieved with many anionic dyes in combination with anionic dispersing agents.

Surprisingly it has been discovered that more concentrated and stable aqueous dispersions of anionic dyes can be obtained with nonionic dispersing agents, and mixing to obtain a particle size of less than 10$\mu$. The nonionic dispersing agents are ethoxylated ethers, ethoxylated fatty acids, ethoxylated fatty alcohols and oils, and alkylene oxide block copolymers, used singly or as mixtures.

The preferred nonionic dispersing agents for use herein are block copolymers of propylene oxide and ethylene oxide, particularly those where the ethylene oxide portion of the polymer has been condensed with ethylene glycol, and particularly those of molecular weight in the range of about 1000 to about 15000.

In order to prevent drying out during storage, the stable dispersions may contain humectants, about 5% up to about 30% by weight, such as sorbitol, glycerine, ethylene glycol, polyethylene glycol, propylene glycol, or polypropylene glycol.

Antifoam agents may be used to control the foam level. An effective amount of an antifoaming agent is generally in the range of about 0.01% to about 2% by weight. Effective antifoaming agents include silicone emulsions and 2,4,7,9-tetramethyl-5-decyne-4,7-diol. Some propylene oxide-ethylene oxide block copolymers, preferred herein as nonionic dispersants, also have some antifoaming action so that little or no additional antifoaming agent is needed when these propylene oxide-ethylene oxide block copolymers are used as dispersants.

Wetting agents may be used to control viscosity, dispersion and stability and to give better application on the substrates, such as textile or paper. Typical wetting agents, used in an amount of about 0.1% to about 5% by weight are 2,4,7,9-tetramethyl-5-decyne-4,7-diol, dioctyl sodium sulfosuccinate and ethylene oxide-ester condensates.

Anti-sedimentation agents, such as alginates, locust bean flour or other natural gums or synthetic cellulose gums, may be used in amounts of about 0.1% to about 10% by weight, to increase the stability of the dispersed anionic dyes.

Chelating agents, such as sodium hexametaphosphate, tetrasodium pyrophosphate or tetrasodium ethylenediamine tetraacetate, and hydrotropic agents, such as urea, sodium xylene sulfonate, and alkyl naphthalene sodium sulfonate may be employed to improve solubility in hard water. Chelating agents and hydrotropic agents are effective in amounts of about 0.5 to about 5.0% by weight.

To prevent mold formation or decomposition by bacteria, antimicrobials and antifungals such as 6-acetoxy-2,4-dimethyl-m-dioxane or sodium pentachlorophenolate may be added in amounts of about 0.01% to about 1% by weight.

In the case of very finely divided or easily friable dyes the dispersions may be produced by mixing the moist presscake with the dispersing agent until a homogeneous dispersion with a particle size at least below 10$\mu$ is obtained. With more highly crystalline dyes mechanical attrition may be required in order to obtain stable concentrated dispersions. Such dispersions are preferably produced by wet grinding the moist presscake with the dispersing agent in the form of a suspension in a ball, bead or sand mill. After grinding to reduce the particle size to at least below 10$\mu$, the concentrated dispersions are adjusted with water to a standard strength.

These dispersions can be used in automatic liquid metering systems, and by virtue of their containing little or no organic solvents are more benign on the environment after the dye has been applied to the fiber. These anionic dye dispersions also are very suitable for the application of continuous dye processes.

The following examples are given without the invention being limited thereto.

EXAMPLE 1

An amount of 56.0 g of a dyestuff of the formula

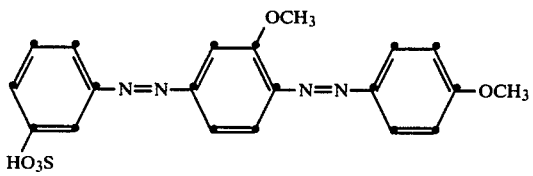

was added, with stirring, to a solution consisting of 89.8 g water, 10.0 g propylene glycol, 0.3 g 2,4,7,9-tetramethyl-5-decyne-4,7-diol, 0.3 g 6-acetoxy-2,4-dimethyl-m-dioxane, 0.8 g compounded silicone emulsion DB-110A from Dow Corning, 22.4 g of an ethylene oxide/propylene oxide block copolymer of about 14,000 MW and consisting of about 20% poly(oxypropylene) and 80% poly(oxyethylene), 5.6 g of an ethylene oxide/propylene oxide block copolymer of similar composition and 8,350 MW and 5.6 g sodium hexametaphosphate, and the resulting suspension was well homogenized by continued stirring or by passing through a colloid mill to speed the breakup of agglomerates. With the aid of a ball mill, the mixture was ground and dispersed until the particle size of the dyestuff was below 10μ. Similar results are obtained by use of a sand, glass-ball, porcelain-ball, or shot mill.

Additions were subsequently made to the above fluid dispersion of the following constituents: 10.0 g propylene glycol, 2.8 g Superclear 100-N natural gum thickener from Diamond Shamrock and 9.6 g water.

The dispersion was then thoroughly homogenized by stirring or passing through a homogenizer.

The dyestuff dispersion produced in this manner had a low viscosity (<400 cp/20° C.) and remained unchanged during a storage time of several months. It is immediately ready for use and can be used directly for the production of dye baths. It is especially useful for the direct metering system that can be employed in the large scale dyeing of polyamide fibers.

EXAMPLE 2

An amount of 51.2 g of a dyestuff of the formula

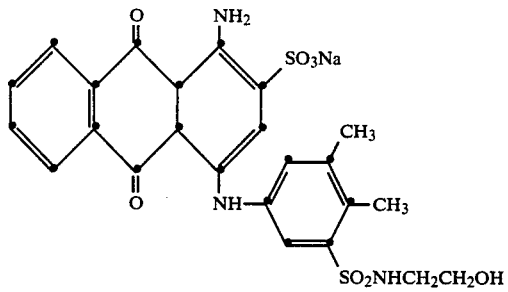

was added, with stirring to a solution consisting of 77.1 g water, 16.0 g ethylene glycol, 0.3 g 2,4,7,9-tetramethyl-5-decyne-4,7-diol, 0.3 g 6-acetoxy-2,4-dimethyl-m-dioxane, and the resulting suspension was well homogenized by continued stirring or by passing through a colloid mill.

An addition of 3.8 g of the 14,000 MW and 1.3 g of the 8,350 MW ethylene oxide-propylene oxide block copolymers of Example 1 was made and the suspension was ground and dispersed in a ball mill until the dyestuff particles were below 10μ in diameter.

The following additions were then made to this fluid dispersion: 6.0 g ethylene glycol, 64.0 g water. The dispersion was then thoroughly homogenized by stirring or passing through a homogenizer. This preparation had a low viscosity (150 cp/20° C.) and remained storage stable for several months.

EXAMPLE 3

According to the procedure of Example 1, 40.0 g of the dyestuff of the formula

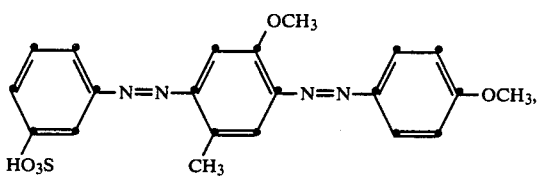

82.7 g water, 16.0 g ethylene glycol, 0.3 g 6-acetoxy-2,4-dimethyl-m-dioxane, 3.0 g each of 2 ethyoxylated lauryl ethers having an average of 4 and 22 ethoxy ether units respectively and 15.0 g water, in place of the ingredients and amounts of materials set out in Example 1, were treated to give a fluid, stable dispersion with similar good properties to those of Example 1.

EXAMPLE 4

The following constituents were used: 40.0 g of the dyestuff of the formula

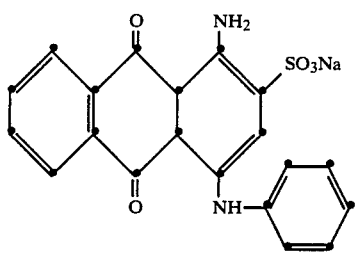

3.8 g water, 16.0 ethylene glycol, 0.3 g 2,4,7,9-tetramethyl-5-decyne-4,7-diol, 0.3 g 6-acetoxy-2,4-dimethyl-m-dioxane, 0.6 g compounded silicone emulsion DB-110A, 4.0 g of the 14,000 MW ethylene oxide-propylene oxide block copolymer of Example 1, and 15.0 g water in the procedure of Example 1, to give a fluid, stable dispersion with properties similar to those of the product of Example 1.

EXAMPLE 5

The following constituents were used: 40.0 g of the dyestuff of the formula

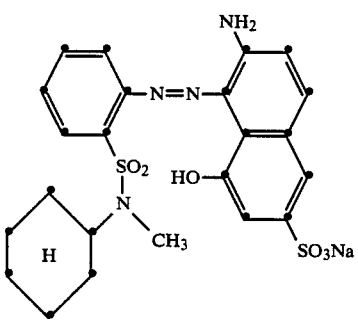

79.7 g water, 16.0 g propylene glycol, 0.3 g 6-acetoxy-2,4-dimethyl-m-dioxane, 0.2 g 2,4,7,9-tetramethyl-5-decyne-4,7-diol, 0.8 g compounded silicone emulsion DB-110A, 2.0 g sodium xylene sulfonate, 6.0 g of an ethylene oxide-propylene oxide block copolymer of about 1900 MW and consisting of about 50% poly(oxypropylene) and 50% poly(oxyethylene) and 15.0 g water in the procedure of Example 1, to give a fluid, stable dispersion similar to that of the product of Example 1.

EXAMPLE 6

An amount of 40.0 g of the dyestuff of the formula

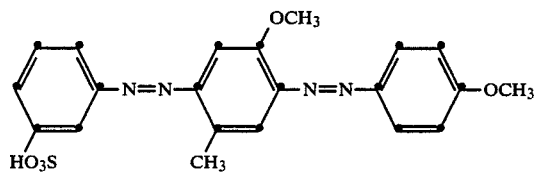

was added, with stirring, to a solution consisting of 82.7 g water, 0.3 g 6-acetoxy-2,4-dimethyl-m-dioxane, 0.3 g 2,4,7,9-tetramethyl-5-decyne-4,7-diol, 0.8 g compounded silicone emulsion DB-110A, 6.0 g of the 8,350 MW ethylene oxide/propylene oxide block copolymer of Example 1 and 6.0 g tetrasodium pyrophosphate, and the resultant suspension was well homogenized by continued stirring. If desired a colloid mill may be employed to speed the breakup of applomerates. Wet grinding is unnecessary.

Additions were subsequently made to the above fluid dispersion of the following constituents: 4.0 g dialkyl ester of a polyglycol, Acrysol TT-678 from Rohm and Haas, and 15.0 g water. The dispersion was then thoroughly stirred.

The dispersion produced in this manner is immediately ready for use and exhibits similar good storage stability and fluid characteristics to that prepared by the method of Example 1.

EXAMPLE 7

An amount of 51.0 g of a dyestuff of the formula

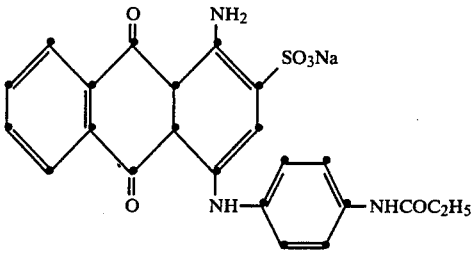

was added with stirring to a solution consisting of 64.6 g water, 17.5 g ethylene glycol, 0.3 g 2,4,7,9-tetramethyl-5-decyne-4,7-diol, 0.3 g 6-acetoxy-2,4-dimethyl-m-dioxane, 0.7 g compounded silicone emulsion DB-110A, 2,8 g polyethylene glycol 200 monolaurate, 2.0 g polyoxyethylene (20) stearyl ether, 3,5 g natural gum thickener (Superclear 100N) and 31.8 g water in the procedure of Example 1 to give a fluid stable dispersion with properties similar to those of the product of Example 1.

What is claimed is:

1. A stable dyestuff composition which is a water solution of an anionic dye, containing a nonionic dispersing agent, and having dispersed therein undissolved particles of the dye which are $10\mu$ or less in diameter, wherein the composition consists essentially of about 40% to about 80% by weight of water, about 15% to about 40% by weight of the dye and about 1% to about 25% by weight of the dispersing agent.

2. The composition of claim 1, wherein the dispersing agent is selected from the group consisting of propylene oxide-ethylene oxide block copolymers, polypropylene-polyethylene glycol polymers, aryl polyoxyethylene ethers, fatty acid/ethylene oxide condensates, polyoxyethylated fatty alcohols, and polyoxyethylated vegetable oils.

3. The composition of claim 2 wherein the dispersing agent is a block copolymer of propylene oxide and ethylene oxide of molecular weight in the range of about 1000 to about 15000 or a mixture of said copolymers.

4. The composition of claim 3, wherein the ethylene oxide portion of the block copolymer has been condensed with ethylene glycol.

5. The composition of claim 1, further containing an effective amount at least one of the additives selected from the group consisting of fungicides, antimicrobials, humectants, anti-sedimentation agents, wetting gents, chelating agents, hydrotropic agents, and anti-foaming agents.

6. The composition of claim 5, wherein the effective amounts, in weight-percents, are as follows:
0.01–1% of a fungicide
0.01–1% of an antimicrobial
5–30% of a humectant
0.1–10% of an anti-sedimentation agent
0.1–5% of a wetting agent
0.5–5% of a chelating agent
0.5–5% of a hydrotropic agent
0.01–2% of an antifoaming agent.

* * * * *